Nov. 30, 1943.    K. BERTRAM ET AL    2,335,380
PROCESS FOR DRYING WHEY
Filed Jan. 27, 1939
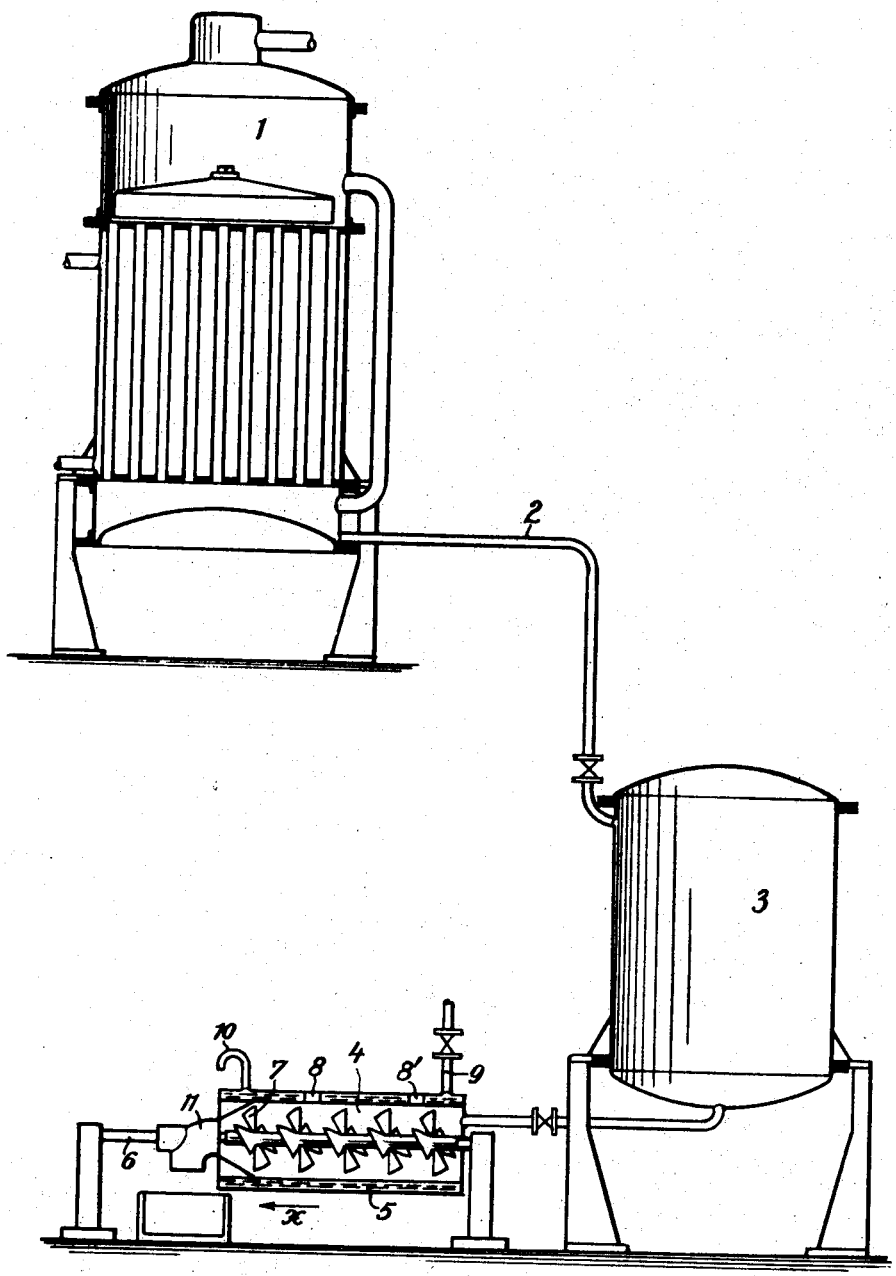
Inventors:
K. Bertram & E. Lemmrich
Attorny:
E. F. Wenderoth Patented Nov. 30, 1943

2,335,380

UNITED STATES PATENT OFFICE 2,335,380

PROCESS FOR DRYING WHEY

Kurt Bertram, Berlin-Karolinenhof, and Erich Lemmerich, Mulheim-Ruhr, Germany; vested in the Alien Property Custodian Application January 27, 1939, Serial No. 253,214
In Germany January 29, 1938

2 Claims. (Cl. 99—57)

The present invention relates to a process and an apparatus for drying dairy products, particularly whey.

Processes of this kind are known. It has been proposed to first partially desiccate the dairy product by means of an ordinary vaporizer and to subsequently mix the inspissated product with absorbing means, such as bran. This mixture is then dried in a kiln. This known process served the purpose only of producing foodstuffs.

Furthermore, it has been attempted in inspissating dairy products by means of a vaporizer to control the acid content so as to obtain 8 to 10% lactic acid in the inspissated syrup. This high acid content was intended to preserve the syrup.

It has been also proposed to pre-inspissate whey in a vaporizer and to subsequently dry the product on heated cylinders. This process consumes considerable heat energy and requires large plants limiting the practical use of the process considerably.

According to the present invention, the dairy product is first pre-inspissated substantially until crystallisation commences and is then intimately mixed with air to form a porous body, the heat present in the pre-inspissated product and the heat liberated therein by crystallization being dissipated from the voluminous body by cooling the same. Preferably, the air to be mixed with the product is fed under pressure. This process combines numerous advantages which, if obtainable at all in the prior art processes, could not be obtained together. All of the dry substance contained in the pre-inspissated liquid is obtained during the drying process without the necessity of forming foam.

It is no longer necessary to subject the dry product so obtained to any subsequent drying treatment. The pre-inspissated product is completely dried in a single operation subsequent to the preceding vaporizing step. The final product so obtained is a porous matter which is neither foamy nor plastic. The product is no longer hygroscopic and may be, therefore, stored for any length of time. The new drying process is particularly applicable to all kinds of whey, such as whey produced by lactic acid, sulphuric acid, hydrochloric acid or rennet. This is a substantial advantage over the known process employing drying cylinders.

The novel process is preferably practiced by means of an apparatus including a container which may be cooled and through which the pre-inspissated dairy product is fed. Within this container beating tools are provided which are operative to finely divide the dairy product and to mix the same with air, simultaneously feeding the inspissated dairy product through the container.

The product which may be inspissated in an evacuated vaporizer until it contains 65% solid substance and until crystallization takes place is subsequently intimately mixed during such crystallization with air in a single operation thus forming a porous body. In this manner, the material is further desiccated within a very short period to a degree guaranteeing durability and resulting in a stiff, hard and dry product. This result is obtained by intimately mixing the crystallizing product with a gaseous medium, preferably with air. As a result of this mixing operation, a porous body is formed provided with an infinite multiplicity of air conduits which have a very large surface and expose every particle of the material, even the minutest particles, to the atmosphere which is not possible with a plastic material or with a foam. As a result, the heat imparted to the product in the vaporizer causes the humidity to be immediately vaporized, the heat produced by the resulting crystallization being largely dissipated to the atmosphere during the drying process. When the material so obtained is subsequently crushed, its porous structure results in a powder which, because of its large surface, is very easily soluble. Moreover, this process has the advantage that the drying operation takes place at a very low temperature which does not affect the material and, therefore, the final product may be regarded reversible.

In the accompanying drawing, an apparatus for carrying out the novel product is illustrated as an example of the present invention.

The dairy product, for instance whey, is inspissated in a known manner within a vaporizer 1. From this vaporizer a conduit 2 leads to an intermediary container 3. This container is connected with a cylindrical container 4 surrounded by a cooling jacket 5. The ends of the container 4 are closed by cover plates through which a shaft 6 extends. On the shaft 6 beaters 7 are mounted which when driven will impart a feed motion in the direction of the arrow $x$ to the inspissated whey. In the cooling jacket 5 openings 8, 8' are provided through which atmospheric air may enter into the interior of the container 4. The cooling medium enters the jacket through a pipe 9 and is discharged through a pipe 10.

At the end of the container 4 a pipe 11 is provided through which the material is discharged which has been fed by the beating and mixing means 7 through the container.

In the container 4 the material is intensely beaten and intimately mixed with air. During this step the pulp entering at a temperature of about 68° C. is considerably cooled, for instance, to 28°. The material discharged from the container 4 may be formed to a cake or may be finely ground in a suitable pulverizer.

The above temperatures are mentioned only to exemplify the process since the most suitable temperatures may be readily selected in dependence on the nature of the dairy product and on many other factors.

While the invention is described hereinabove by reference to specific embodiments thereof, it is to be understood that the invention is not limited to the details thereof but is capable of numerous modifications within the scope of the appended claims.

What we claim is:

1. A method of drying dairy products, particularly whey, comprising pre-inspissating the dairy product in a vacuum until such product has a content of solid substances so that the pre-inspissated solution is oversaturated with respect to its content of lactose, then after the beginning of crystallization introducing air into the product by means of beating tools and simultaneously cooling the product.

2. A method of drying dairy products, particularly whey, comprising pre-inspissating the dairy product in a vacuum until such product has a content of solid substances so that the pre-inspissated solution is oversaturated with respect to its content of lactose, then after the beginning of crystallization introducing air under pressure into the product by means of beating tools and simultaneously cooling the product.

KURT BERTRAM.
ERICH LEMMERICH.